Jan. 9, 1951      F. C. VALENTIN      2,537,382

GEAR OPERATED, BOLT-HOLDING WRENCH

Filed Nov. 18, 1949

INVENTOR.
Fred C. Valentin
BY
Munn, Liddy & Glaccum
Attorneys

Patented Jan. 9, 1951

2,537,382

UNITED STATES PATENT OFFICE 2,537,382

GEAR OPERATED, BOLT-HOLDING WRENCH

Fred C. Valentin, Brooklyn, N. Y., assignor to Vee-Lox Rivet & Tool Corporation, Brooklyn, N. Y., a corporation of New York Application November 18, 1949, Serial No. 128,197

1 Claim. (Cl. 81—56)

This invention relates to a new and useful form of power tool and has particular reference to a tool in which a nut may be rotated upon a threaded shaft or stem while the stem itself is held from rotation by an element in the tool.

This invention has particular reference to the tightening of special rivets on and in association with metal plates as shown and described in a co-pending application to one A. N. Volpe, Serial No. 52,260, filed June 8, 1949, and entitled "Self Counter-Sinking Rivet," now abandoned.

In threaded shafts or stems of the type illustrated in the above mentioned application, in which the threaded shafts or stems take the form of rivets, it becomes neceessary to pass the headed stem or shaft through the plates to be joined and to tighten a nut on one side of the plates while holding the shaft stationary during this tightening. In inaccessible places, this ability is of extreme importance.

To this end, I have invented a tool which has a rotatable socket element which can embrace the nut to be tightened on the stem, and is also provided with a fixed non-rotatable stub shaft with a slot in which is disposed a flattened end of the shaft or rivet or stem on which the nut is mounted.

Briefly and generally considered, the invention includes a casing or housing comprising on one side, a rotatable shell-like sleeve connected by gear means to a drive shaft and having therewithin a fixed slotted stub shaft to receive the flattened end of the stem on which is a nut to be engaged by the sleeve and turned on the threaded shaft. Thus a threaded stem can be inserted through a surface, can be engaged on one end by the tool and the nut tightened up thereon without any one having to employ hands or especial appliances to hold the shaft or stem while this tightening is being performed.

The present preferred form which the invention may assume is illustrated in the drawings, of which:

Figure 1:
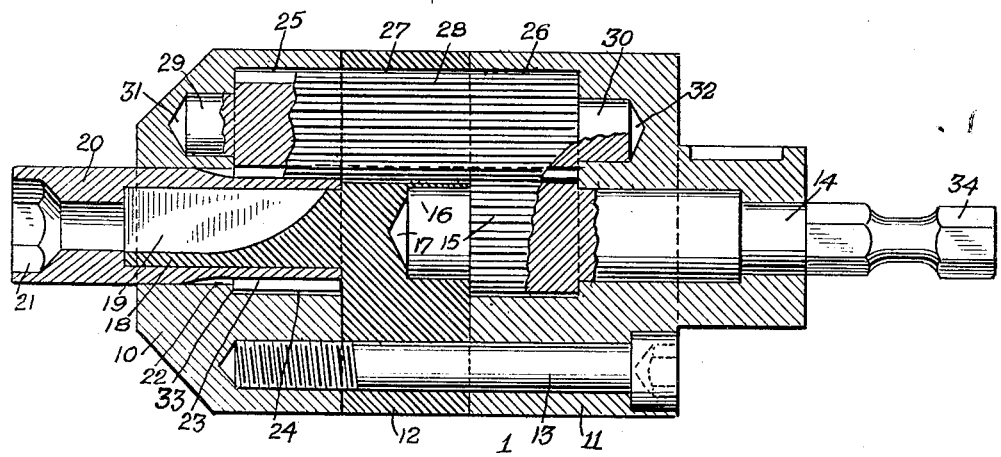
Fig. 1 is a vertical longitudinal section through the device taken on the line 1—1 of Fig. 2.
Figure 2:
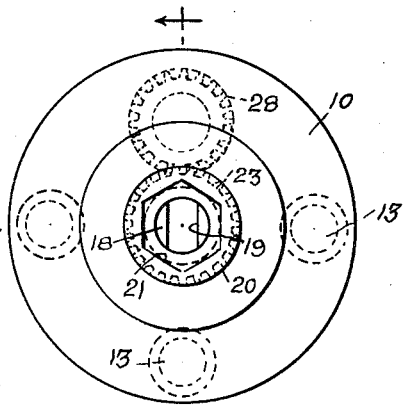
Fig. 2 is an end elevation of the device taken from the left end of Fig. 1.
Figure 3:
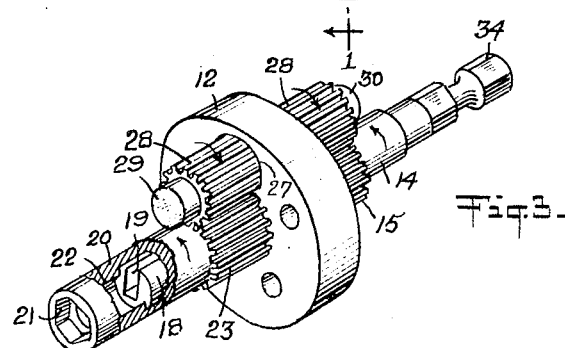
Fig. 3 is a perspective view of certain operating parts of the device.

Referring now merely to the specific form of the device shown in the drawings, it is to be noted that there is a housing block formed of three castings 10, 11 and 12 held together by bolts 13. The rear casting is provided with a bore to receive a rotatable shaft 14 on the inner end of which is a pinion 15. The shaft 14 at its extreme inner end 16 extends into a bore 17 in the intermediate casting 12.

On its left face, the casting 12 has an integral stub shaft 18 projecting therefrom and this stub shaft has a longitudinal transverse slot 19 cut therein to receive the end of an article to be worked on as will later be described. Surrounding this stub shaft 18, is a rotatable cylindrical shell 20 having preferably a hexagonal socket 21 in its outer end. This shell fits in a bore 22 in the casting 10 and has on its inner end a pinion 23. This pinion rides in a slightly larger bore 24 in the casting 10, and its inner end lies adjacent the front face of the casting 12. Thus it is obvious that the shell 20 may be rotated around the stub shaft 18 when its pinion is engaged and turned.

The castings 10, 11 and 12 are also provided with aligned bores 25, 26 and 27, in which lies an elongated gear 28 which at its rear end, meshes with the pinion 15 and at its front end, meshes with the pinion 23 on the shell 20. The ends of the gear 28 are provided with stub shafts 29 and 30, which lie respectively in bores 31 and 32 in the castings 10 and 12 as illustrated. The bores 22 and 24 because of their differences in diameter form a shoulder 33 which prevents the pinion 23 and the shell 20 from moving out of the bore 22 in the casting 10.

From the above description, it is clear that when a motor or other rotative power is applied to the outer end 34 of shaft 14, it will be turned and therefore will turn pinion 15. This, in mesh with gear 28, will cause said gear to rotate and this, being in mesh with pinion 23, will cause the rotation of pinion 23. Since pinion 23 is fixed on shell 20, it will turn said shell and thus turn socket 21 to turn whatever element is disposed in said socket while at the same time, holding in a non-rotatable manner any element which may be disposed in the slot 19 of the stub shaft 18 forming a fixed integral part of the intermediate casting 12.

Figure 4:
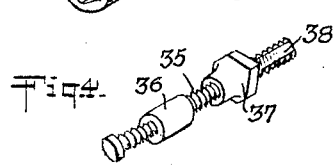
Fig. 4 is a perspective view of an article such as a special rivet upon which the tool may be adapted to work.

This tool is adapted for especial use in connection with the application of rivets to plates such as shown in Figure 4, in which the rivet has a threaded body 35 on which are adjustably disposed a collar or sleeve 36 and a hexagonal nut 37. The rivet threaded body is inserted through the plates or elements to be connected with the collar 36 on one side of the joined elements and with the nut 37 on the other side. Then the tool herein is applied to the nut with the nut engaged by the hexagonal socket 21 thereof and with the flat end 36 of the rivet body disposed in the slot 19 in the stub shaft 18 to keep the rivet threaded body from turning while the nut 37 is being turned. This type of rivet and its application and use is set forth clearly and fully in co-pending application, Serial No. 52,260, filed June 8, 1949, in the name of A. N. Volpe, and entitled "Self Counter-Sinking Rivet."

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

What I claim as my invention, is:

A power tool which comprises two spaced castings suitably bored and an intermediate casting, said castings held together by bolts, a rotatable shell disposed in the bore of one of the spaced castings and projecting therefrom with a socket on its outer end and a pinion on its other end within the casting, a stub shaft on the intermediate casting and projecting into said shell, the end of said stub shaft having a slot opening into its end face to receive a stem inserted within the shell to hold the stem from rotation, the socket on the end of the shell adapted to engage a nut on the stem, a drive shaft disposed in a bore in the other spaced casting and projecting therefrom at one end and having a pinion on the other end within the last mentioned casting, said castings being provided with aligned bores parallel to the first mentioned bores and an elongated gear disposed in said aligned bores and meshing with the pinions on the drive shaft and the shell whereby the turning of the drive shaft will turn the shell to turn the nut on the stem without turning the stem.

FRED C. VALENTIN.

REFERENCES CITED

The following references are of record in the file of this patent:

UNITED STATES PATENTS

| Number | Name | Date |
| --- | --- | --- |
| 667,044 | Thorsen | Jan. 29, 1901 |
| 786,660 | Moore | Apr. 4, 1905 |
| 1,343,667 | Evensen | June 15, 1920 |
| 1,389,468 | White | Aug. 30, 1921 |
| 1,824,300 | Rowland | Sept. 22, 1931 |
| 2,275,633 | Keiser | Mar. 10, 1942 |
| 2,479,225 | Gann | Aug. 16, 1949 |